United States Patent
Willig et al.

(10) Patent No.: US 9,591,263 B2
(45) Date of Patent: Mar. 7, 2017

(54) TECHNIQUE FOR VIDEO CONFERENCING

(71) Applicant: TELEFONAKTIEBOLAGET LM ERICSSON (PUBL), Stockholm (SE)

(72) Inventors: Johannes Willig, Bornheim (DE); Laurits Hamm, Aachen (DE); Matthias Schreiber, Aldenhoven (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/151,849

(22) Filed: May 11, 2016

(65) Prior Publication Data

US 2016/0255308 A1 Sep. 1, 2016

Related U.S. Application Data

(62) Division of application No. 14/239,356, filed as application No. PCT/EP2011/004199 on Aug. 19, 2011, now Pat. No. 9,479,735.

(51) Int. Cl.
*H04N 7/14* (2006.01)
*H04N 7/15* (2006.01)
(Continued)

(52) U.S. Cl.
CPC ......... *H04N 7/155* (2013.01); *H04L 65/1016* (2013.01); *H04L 65/403* (2013.01);
(Continued)

(58) Field of Classification Search
CPC . H04L 65/1016; H04L 65/403; H04L 65/605; H04L 12/18; H04L 63/102;
(Continued)

(56) References Cited

U.S. PATENT DOCUMENTS

2004/0128354 A1* 7/2004 Horikiri ............ H04L 29/06027
709/204
2004/0207724 A1* 10/2004 Crouch ............ H04L 29/06027
348/14.09
(Continued)

FOREIGN PATENT DOCUMENTS

JP   2000349913 A   12/2000
WO     9917235 A1    4/1999
(Continued)

OTHER PUBLICATIONS

Office Action issued on Sep. 4, 2015, in corresponding European application No. 11 748 281.0, 5 pages.

*Primary Examiner* — Khai N Nguyen
(74) *Attorney, Agent, or Firm* — Rothwell, Figg, Ernst & Manbeck, P.C.

(57) ABSTRACT

A video conference client device comprises a communication unit configured to receive a first media stream representing a recorded video conference and further configured to receive meta data related to the first media stream, the meta data representing events in the video conference, a processing unit connected to the communication unit and configured to carry out a concatenation process during which at least a part of the first media stream and at least a part of the meta data are concatenated into a video signal, and a man machine interface unit connected to the processing unit. The man machine interface unit comprises a display unit configured to display the video conference and an input unit configured to generate a video conference navigation signal. The use of the video conference navigation signal and the meta data enables a user to easily navigate through the history of the video conference.

17 Claims, 6 Drawing Sheets

(51) Int. Cl.
*H04L 29/06* (2006.01)
*H04L 29/08* (2006.01)

(52) U.S. Cl.
CPC .......... *H04L 65/605* (2013.01); *H04L 65/608* (2013.01); *H04L 67/02* (2013.01); *H04N 7/15* (2013.01)

(58) Field of Classification Search
CPC ............... H04L 63/105; H04L 65/4038; H04L 65/4084; H04L 65/4092; H04L 65/602; H04L 65/604; H04L 65/607; H04N 7/155; H04N 2007/145; H04N 5/272; H04N 7/14; H04N 7/141; H04N 7/142; H04N 7/144; H04N 7/147; H04N 7/148; H04N 7/15; H04N 7/152; H04N 7/157; H04N 7/23206; G01S 5/0072; G06F 17/3028; H04M 1/72572; H04M 2201/40; H04M 2250/52; H04M 3/4936; H04M 3/5191; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270
See application file for complete search history.

(56) References Cited

U.S. PATENT DOCUMENTS

| | | | | |
|---|---|---|---|---|
| 2005/0243166 | A1* | 11/2005 | Cutler | H04N 7/15 348/14.12 |
| 2006/0212580 | A1* | 9/2006 | Wu | H04L 65/4092 709/227 |
| 2006/0259552 | A1* | 11/2006 | Mock | H04L 29/06027 709/204 |
| 2008/0235403 | A1* | 9/2008 | Krantz | H04L 67/04 709/249 |
| 2008/0250066 | A1* | 10/2008 | Ekstrand | H04M 1/274516 |
| 2008/0313550 | A1* | 12/2008 | Shiga | G06Q 10/107 715/753 |
| 2010/0173618 | A1 | 7/2010 | Kass | |
| 2014/0129942 | A1* | 5/2014 | Rathod | H04N 21/44222 715/720 |
| 2014/0198173 | A1* | 7/2014 | Willig | H04N 7/15 348/14.03 |

FOREIGN PATENT DOCUMENTS

| | | |
|---|---|---|
| WO | 2008033030 A1 | 3/2008 |
| WO | 2011015871 A2 | 2/2011 |

\* cited by examiner

TECHNIQUE FOR VIDEO CONFERENCING

CROSS REFERENCE TO RELATED APPLICATIONS

This application is division of U.S. patent application Ser. No. 14/239,356, filed Feb. 18, 2014, which is a 35 U.S.C. §371 National Phase Entry Application from PCT/EP2011/004199 filed Aug. 19, 2011, both disclosures of which are incorporated by reference.

TECHNICAL FIELD

The present disclosure generally relates to the technical field of video conference systems. In particular, the present disclosure relates to a video conference client device, a media stream server device, a video conference system, and methods of operating same.

BACKGROUND

Video conferencing has been in use for many years. In a video conference, several users dial into a conference at the same time or at different points of time. During the video conference, audio data and video data are transmitted to (and from) the user devices. The transmission of audio data and video data is typically done using streaming technologies.

Hypertext Transfer Protocol (HTTP) based streaming of multimedia content (including audio data and video data) is a newer technology with high momentum. HTTP based streaming can also be used to stream video conferences. As an alternative to HTTP, the streaming of multimedia content can also be performed in accordance with the Real Time Streaming Protocol (RTSP).

HTTP based streaming has the advantage that it re-uses existing Internet infrastructure and is mostly client based. The latter means that HTTP based streaming does not require (substantial) modification of existing HTTP servers. Media files and media description files may be stored on a HTTP server from where an HTTP client fetches the files using HTTP GET commands.

HTTP based streaming solutions are already standardized for the Internet Protocol Multimedia Subsystem (IMS). A video conferencing system based on IMS uses an IMS core network, one or more Application Servers (ASs) in the control plane, and a Media Resource Function (MRF) in the user plane for conference bridges or media transcoding. A common term for a conference bridge is Multipoint Control Unit (MCU).

Due to the use of streaming technologies (which are usually based on live data streams), a user who joins an ongoing video conference may not be able to easily inform himself about the history of the video conference at the time of joining the video conference.

SUMMARY

A need arises to provide a video conference system which enables a user to join an already ongoing video conference at an arbitrary point of time and, in particular, to obtain information, at the time of joining the video conference, about the history of the video conference.

According to a first aspect, a video conference client device is provided, comprising: a communication unit configured to receive a first media stream representing a recorded video conference and further configured to receive meta data related to the first media stream, the meta data representing events in the video conference; a processing unit connected to the communication unit and configured to carry out a concatenation process during which at least a part of the first media stream and at least a part of the meta data are concatenated into a video signal; and a man machine interface unit connected to the processing unit. The man machine interface unit comprises: a display unit configured to display the video conference on the basis of the video signal; and an input unit configured to generate, based on an input, a video conference navigation signal. The processing unit is configured to control play out of the video signal in dependence on the video conference navigation signal.

The communication unit may be configured to receive, in addition to the first media stream, a second media stream. In this case, the processing unit may be configured to selectively generate the video signal from at least one of the first media stream and the second media stream. The video signal (e.g., a concatenation of at least parts of the first media stream, the second media stream, and the meta data) may be generated based on the video conference navigation signal. Thus, the content of several media streams may be mixed to allow a user to easily access the content of different media streams on demand.

According to one implementations, data of the first media stream received latest by the communication unit represents a first point of time of the video conference, and data of the second media stream received latest by the communication unit represents a second point of time of the video conference, wherein the first point of time is older than the second point of time. "Older" in this context means that the first point of time has happened before the second point of time. The second point of time may represent the present moment or a point of time close to the present moment of the video conference. For example, the second media stream may be a live media stream.

The man machine interface unit may comprise one or more video conference navigation tools including at least one of a time bar, a time slider, a play button, a forward browsing button, a backward browsing button, a skip button, a stop button, a pause button, or an event button. In this case, the man machine interface unit may be configured to generate, upon actuation of one of the at least one video conference navigation tool based on an input of the input unit, the video conference navigation signal. Further or alternative navigation tools may be used.

In one realization, the man machine interface unit is configured to display a time bar on the display unit which represents the chronological events of the video conference, wherein the input unit is configured to select a point of time on the time bar, and to generate, in response to such a selection, the video conference navigation signal, and wherein the processing unit is configured to generate, in response to the video conference navigation signal, the video signal such that the point of time of the video conference displayed on the display unit corresponds to the selected point of time on the time bar. This kind of navigation may enable a user to easily navigate through a video conference in an intuitive manner.

Additionally, or as an alternative, the man machine interface unit may be configured to display a time slider element on the display unit, and to slide the time slider element along the time bar based on an input of the input unit in order to select a point of time of the time bar, and to generate the video conference navigation signal reflecting the selected point of time on the time bar.

The communication unit may be configured to request the transmission or to stop the transmission of one or both of the first media stream and the second media stream. This approach may in certain situations avoid an unnecessary allocation of bandwidth resources.

The communication unit may be configured to request, in case that the communication unit currently only receives the first media stream, and in case that the video conference navigation signal generated by the input unit implies that the video conference is browsed towards the present moment, the transmission of the second media stream from the media stream server or from a media stream data source different from the media stream server while still receiving the first media stream from the media stream server. Alternatively, the communication unit may be configured to request, in case that the communication unit currently receives the first media stream and the second media stream, and in case that the video conference navigation signal generated by the input unit implies that the video conference is browsed towards the present moment, a stop of transmission of the first media stream from the media stream server to the communication unit while still receiving the second media stream from the media stream server or from a media stream data source different from the media stream server, if a temporal distance between the present moment and a current browsing position falls below a threshold value.

The processing unit may be configured to replace a play out of the first media stream with a play out of the second media stream in case that the video conference has been browsed to the present moment (e.g., to avoid an unnecessary allocation of bandwidth resources).

The display unit may comprise a first display area configured to visualize the first media stream, and a second display area configured to visualize the second media stream. Separate display areas may permit to monitor simultaneously different parts of the video conference, for example the present moment of the video conference and a moment of the past of the video conference. The processing unit may thus be configured to generate the video signal so as to visualize the first media stream and the second media stream simultaneously.

The meta data may comprise video conference event information including at least one of a start or end of the video conference, joining times or departing times of one or more participants of the video conference, one or more slides that were presented during the video conference, the volume of the participants of the video conference, and names of the participants of the video conference. The meta data may also comprise further data. Thus, the meta data generally enables to quickly get an overview over the course of the video conference.

The man machine interface may be configured to display on the display unit, based on the meta data, chronological events as icons or letters along a time bar in correspondence with their time of occurrence.

According to a second aspect, a media stream server configured to transmit a first media stream data is provided. The media stream server comprises a communication unit configured to receive second media stream data representing a video conference from a media stream data source connectable to the communication unit; a processing unit connected to the communication unit and configured to process at least one of the second media stream data and auxiliary information pertaining to the video conference in order to generate meta data related to the second media stream data, the meta data representing events in the video conference; and a storage unit connected to the processing unit and configured to store the second media stream data and the related meta data. The processing unit is configured to generate the first media stream data based on the stored second media stream data, and the communication unit is configured to transmit the first media stream data and the related meta data towards a video conference client device (e.g., in response to a request from the video conference client device).

The use of the media stream server enables a user of the video conference client to receive video stream data on demand. Such a demand may occur if the user likes to watch a particular moment of the history of the video conference without having to store the full video conference locally (i.e., at the video conference client device).

The communication unit may be configured to actively request the media stream data source for transmission of the second media stream data in response to a request received from the video conference client or in response to a request received from the processing unit. This enables to seamlessly invoke operation of the media stream server device on demand.

The processing unit may be configured to request the communication unit to actively establish a communication connection with at least one auxiliary information source in order to collect the auxiliary data. This enables to receive, at the video conference client device, enriched meta data without having the need to generate enriched meta data at a plurality of video conference client devices. Thus, bandwidth capacity can be saved.

The communication unit may be configured to send all already available meta data related to the second media stream data to the video conference client device. The meta data transmission may optionally occur before or when starting to transmit the first media stream data to the video conference client device. In certain scenarios this may enable a user of the video conference client device to get an overview of the video conference (by visualizing the meta data) and then to selectively request only parts of the video conference (e.g., selectively request only parts of the first media stream data).

The communication unit may be configured to send all newly generated meta data immediately or in regular update intervals to the video conference client device. The meta data transmission may optionally occur while transmitting the first media stream data to the video conference client device. In this way, the user may obtain a better overview over the video conference.

The processing unit may be configured to transmit the first media stream data as a single media stream or as a set of parallel media streams. Also, the media stream data source may be configured to transmit the second media stream data as a single media stream or as a set of parallel media streams.

According to a third aspect, a video conference system is provided, comprising: a media stream data source; a media stream server as described herein, the media stream server being connectable to the media stream data source; and a video conference client device as described herein, the video conference client device being connectable to the media stream data source and to the media stream server.

According to a further aspect, a method of operating a video conference is provided, comprising: receiving a first media stream representing a recorded video conference and meta data related to the first media stream, the meta data representing chronological events in the video conference; carrying out a concatenation process during which at least a part of the first media stream and at least a part of the meta data are concatenated into a video signal; generating, based on an input, a video conference navigation signal; and displaying the video conference on the basis of the video signal and the video conference navigation signal.

According to another aspect, a method of handling first media stream data for a video conference is provided, comprising: receiving second media stream data representing a video conference from a media stream data source; processing at least one of the second media stream data and auxiliary information pertaining to the video conference in order to generate meta data related to the second media stream data, the meta data representing chronological events in the video conference; storing the second media stream data and the related meta data; generating the first media stream data based on the stored second media stream data; and transmitting the first media stream data and the related meta data towards a video conference client device (e.g., in response to a request from the video conference client device).

A computer program product is provided also and comprises program code portions which embody/carry out any procedure or method step as described herein when the computer program product is executed on one or more computing devices. The computer program product may be stored on a computer readable recording medium such as a CD-ROM, DVD-ROM or semiconductor memory. The computer program product may also be provided for download via a wired or wireless communication link.

BRIEF DESCRIPTION OF THE DRAWINGS

In the following, the present disclosure will be described in more detail with reference to exemplary embodiments illustrated in the drawings.

DETAILED DESCRIPTION

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 1:
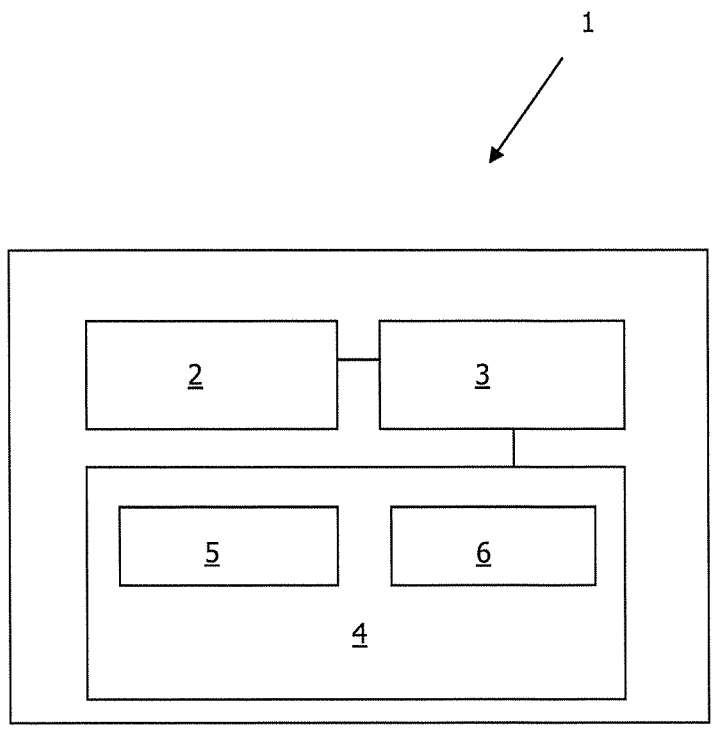
FIG. 1: is a schematic block diagram illustrating an embodiment of a video conference client device.

FIG. 1 shows an embodiment of a video conference client device 1. The client device 1 comprises a communication unit 2 configured to receive a first media stream representing a recorded video conference and further configured to receive meta data related to the first media stream, the meta data representing events in the video conference. A processing unit 3 of the client device 1 is connected to the communication unit 2 and configured to carry out a concatenation process during which at least a part of the first media stream and at least a part of the meta data are concatenated into a video signal.

A man machine interface unit 4 is also comprised by the client device 1 and connected to the processing unit 3. The man machine interface unit 4 comprises a display unit 5 configured to display the video conference on the basis of the video signal and an input unit 6 configured to generate, based on an input, a video conference navigation signal. The processing unit 3 is configured to control play out of the first media stream in dependence on the video conference navigation signal. The use of the video conference navigation signal and the meta data enables a user to easily navigate through the past (i.e., the history) of the video conference.

Figure 2:
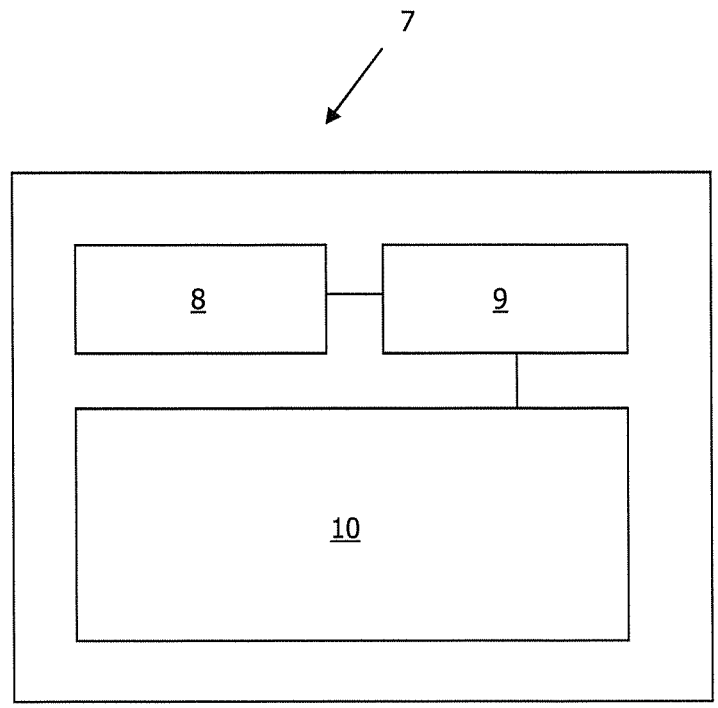
FIG. 2: is a schematic block diagram illustrating an embodiment of a media stream server.

FIG. 2 shows an embodiment of a media stream server 7 that is configured to transmit a first media stream data. The server 7 comprises a communication unit 8 configured to receive second media stream data representing a video conference from a media stream data source connectable to the communication unit 8. The server 7 further comprises a processing unit 9 connected to the communication unit 8 and configured to process at least one of the second media stream data and auxiliary information pertaining to the video conference in order to generate meta data related to the second media stream data, the meta data representing events in the video conference. Thus, in one realization, the communication unit 8 may further be configured to receive the optional auxiliary information.

A storage unit 10 is connected to the processing unit 9 and configured to store the second media stream data and the related meta data. The processing unit 9 is configured to generate the first media stream data based on the stored second media stream data, and the communication unit 8 is configured to transmit the first media stream data and the related meta data to a video conference client device 1 in response to a request from the video conference client device 1.

The use of the media stream server 7 enables a user of the video conference client device 1 to receive (historical) video conference stream data on demand. As an example, the user may thus watch a particular moment of the history of the video conference without having the need to store the full video conference at the video conference client device 1.

Figure 3:
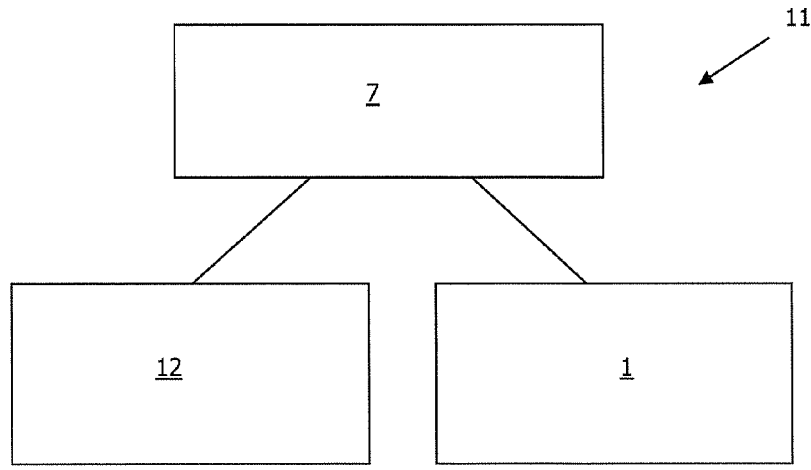
FIG. 3: is a schematic block diagram illustrating an embodiment of a video conference system.

FIG. 3 shows an embodiment of a video conference system 11. The system 11 comprises a media stream data source 12, the media stream server 7 of FIG. 2 that is connected to the media stream data source 12, and the video conference client device 1 of FIG. 1. The video conference client device 1 is connected to the media stream data source 12 and to the media stream server 7.

Figure 4:
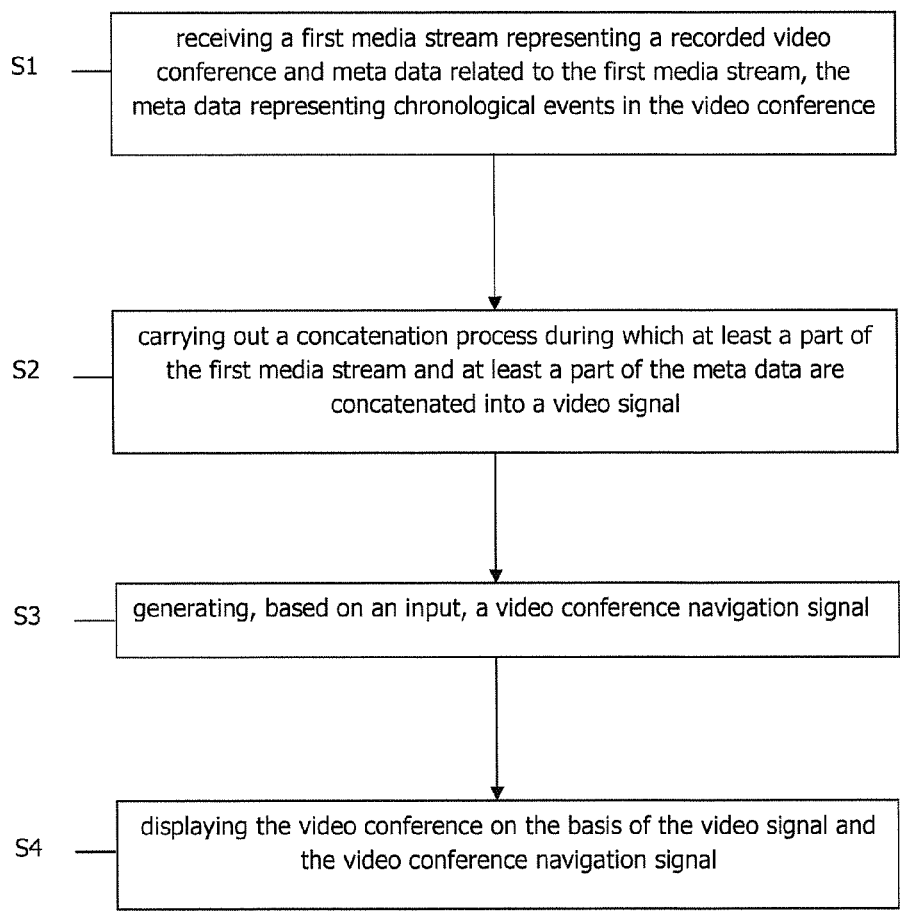
FIG. 4: is a flow chart illustrating a method embodiment of operating a video conference.

FIG. 4 shows a flow chart of a method of operating a video conference which may for example be carried out in the video conference client device 1 shown in FIGS. 1 and 3 as follows.

At step S1, a first media stream representing a recorded video conference as well as meta data related to the first media stream are received by the communication unit 2 of the video conference client device 1, wherein the meta data represents (chronological) events in the video conference. At step S2, a concatenation process is carried out in the processing unit 3 during which at least a part of the first media stream and at least a part of the meta data are concatenated into a video signal.

At step S3, based on an input through the input unit 6, a video conference navigation signal is generated. Then, at step S4, the video conference is displayed on the display unit 5 on the basis of the video signal and the video conference navigation signal.

The communication unit 2 may be configured to receive, in addition to the first media stream, a second media stream. In this case, the processing unit 3 may be configured to selectively generate the video signal from at least one of the first media stream and the second media stream. That is, the video signal may be a concatenation of at least parts of the first media stream, parts the second media stream, and the meta data. In this case, the concatenation process is controlled by the video conference navigation signal. Thus, in dependence on the video conference navigation signal, the content of several media streams may be mixed to allow a user to easily access the content of different media streams on demand.

Figure 5:
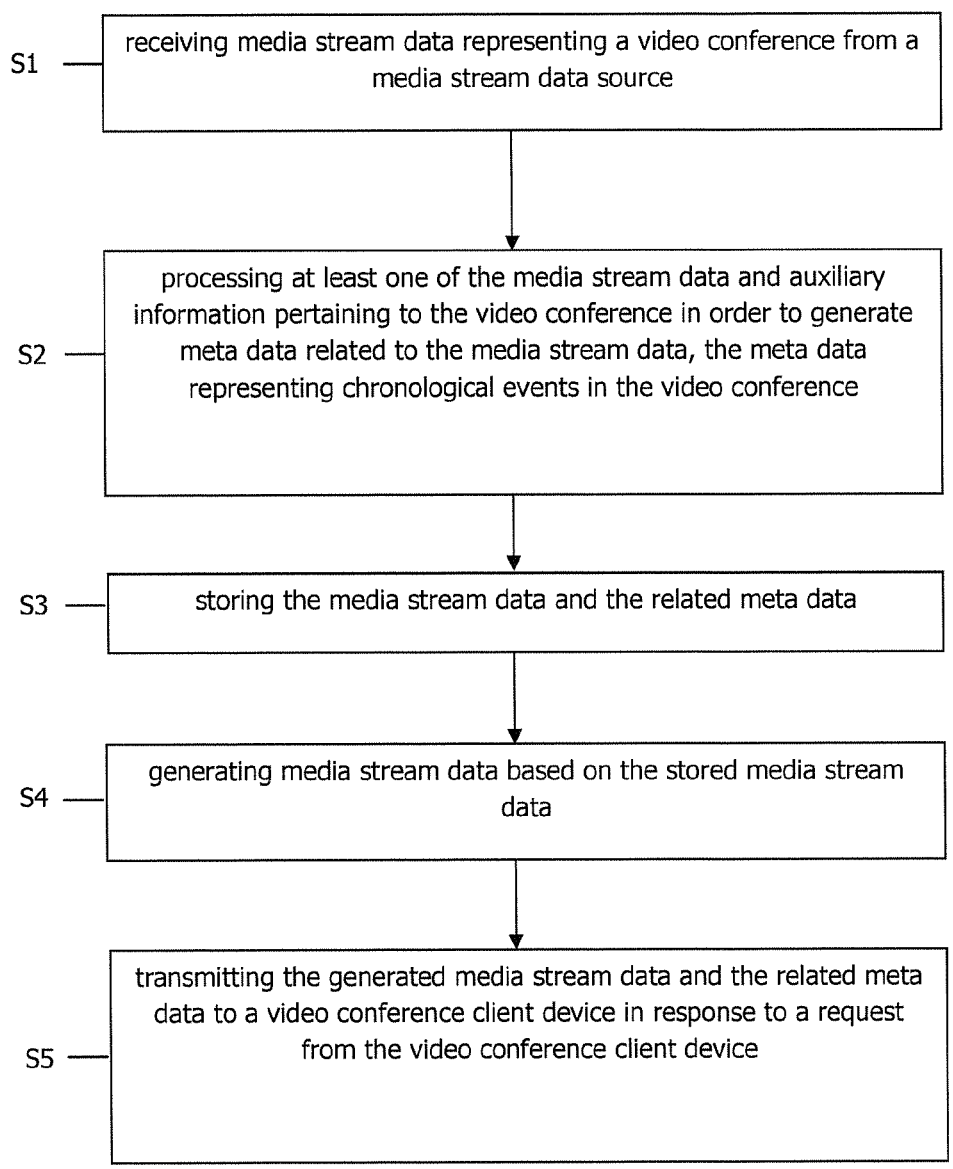
FIG. 5: is a flow chart illustrating a method embodiment of operating a video conference.

FIG. 5 shows a flow chart of a method of handling first media stream data for a video conference which may for example be carried out in the media stream server 7 shown in FIGS. 2 and 3 as follows.

At an initial step S1, second media stream data representing a video conference is received by the communication unit 8 at the media stream server 7 from a media stream data source 12. At step S2, at least one of the second media stream data and auxiliary information pertaining to the video conference are processed by the processing unit 9 in order to generate meta data related to the second media stream data, wherein the meta data represents (chronological) events in the video conference. Then, at step S3, the second media stream data and the related meta data are stored in the storing unit 10.

At step S4, the first media stream data is generated by the processing unit 9 based on the stored second media stream data. At a further step S5, the first media stream data and the related meta data are transmitted towards a video conference client device 1 in response to a request from the video conference client device 1.

Figure 6:
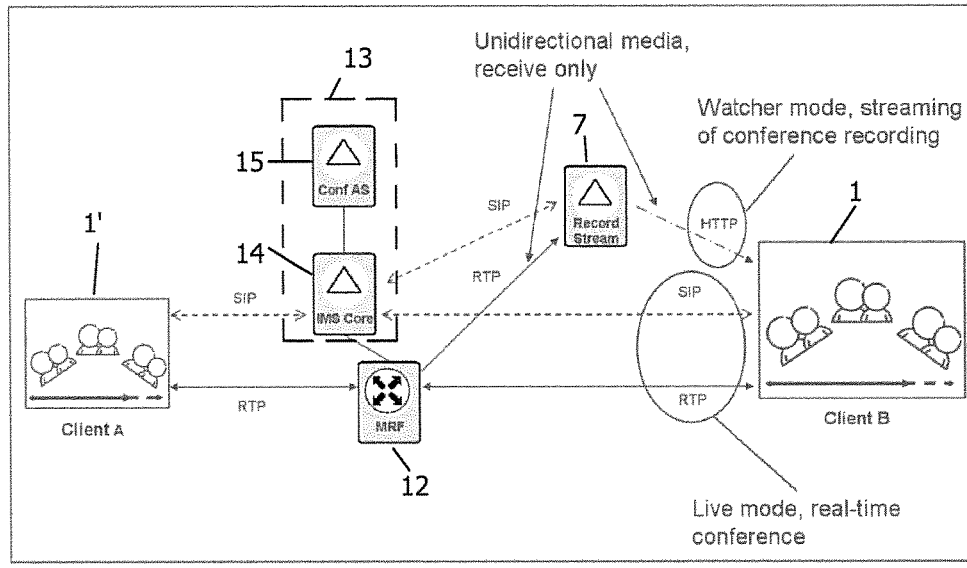
FIG. 6: is a schematic diagram illustrating an embodiment of a video conference system.

FIG. 6 shows in more detail a possible realization of the video conference system shown in FIG. 3. Here, it is assumed that the video conference system is based on IMS (IP Multimedia Subsystem). However, also other technologies may be used.

As can be derived from FIG. 6, a video conference system 11 comprises at least a first video conference client device 1 and a second video conference client device 1', a media stream data source 12 (in the following also referred to as "Media Resource Function" (MRF) unit), and a media stream server 7 (in the following also referred to as "Recording and Streaming Server" (RSS) unit). The video conference system 11 further comprises a video conference controlling unit 13 which comprises a conference signal controlling unit (in the following also referred to as IMS) unit) 14 and a conference management unit 15 (in the following also referred to as "Conference Application Server" (ConfAS) unit). The conference management unit 15 is connected or connectable to the conference signal controlling unit 14, and the conference signal controlling unit 14 is connected or connectable to the media stream data source 12. The media stream data source 12 is further connected or connectable to the first video conference client device 1, the second video conference client device 1', and the media stream server 7. The media stream server 7 is connected or connectable to the first video conference client device 1 and the second video conference client device 1'.

In the context of the present embodiment, "first media stream" indicates in the light of FIG. 6 a media stream transferred from the RSS unit 7 to the video conference client devices 1, 1', whereas "second media stream" indicates in the light of FIG. 6 a media stream transferred from the MRF unit 12 to the video conference client devices 1, 1' and to the RSS unit 7.

"Video conference data" may include in particular one or several of the following data types: audio data, video data, meta data, and presentation data (e.g., data of audio, graphics or video material presented in the video conference). "Media stream" and "media stream data" are interchangeably used; media stream data is partially used to indicate a part of the data of a media stream.

The IMS unit 14 (which may make use of IMS functionalities such as CSCF, HSS, DNS, etc. in an essentially conventional manner) may optionally authenticate the users of the video conference client devices 1, 1' and manages the control signaling SIP (i.e. the sending and receiving of SIP messages to/from the video conference client devices 1, 1' and the media stream server 7). The ConfAS unit 15 provides conference services like the management of booked conferences, and interacts with the IMS unit 14 for signaling. Also, the ConfAS unit 15 reserves media resources via the MRF unit 12 during a video conference setup and dial-in process.

The MRF unit 12 handles a user plane and RTP (Real Time Protocol) media streams. That is, the MRF unit 12 sends and receives RTP media streams to/from the video conference client devices 1, 1' and the media stream server 7. It mixes, routes, and switches media streams, i.e. it distributes video conference data received from the video conference client devices 1, 1'. For example, several audio streams may be mixed by the MRF unit 12. Video streams may be switched by the MRF unit 12 without transcoding (simulcast), or may be transcoded and mixed using splitscreen or picture in picture.

The RSS unit 7 records the video conference (by recording respective RTP media streams received from the MRF unit 12) which has been joined by the video conference client devices 1, 1' from and end user perspective ("silent participant" receiving video conference data) and prepares and provides media streams to the video conference client devices 1, 1' representing the video conference for later playback in a Watcher Mode. Further, the RSS unit 7 may generate meta data referring to the recorded video conference.

A scheduled conference between the video conference client devices 1, 1' may be established by the IMS unit 14 using SIP protocols and by the MRF unit using RTP protocols. The RSS unit 7 receives video conference data generated by the video conference client devices 1, 1' during the video conference (like audio data, video data, meta data, and presentation data), but does not generate itself video conference data since the RSS unit 7 is passive, i.e., not an active participant of the video conference. As mentioned above, the RSS unit 7 may generate the meta data.

The RSS unit 7 may join the video conference as a silent participant (e.g., directly after the start of the video conference assuming that the video conference was configured to provide both recorded streaming and live streaming). After joining, the RSS unit 7 receives all relevant video conference data in the form of media streams from the MRF unit 12 (which acts as conference bridge) as if the RSS unit 7 would be a normal video conference participant, but the RSS unit 7 does not send any video conference data back to the MRF unit 12.

The RSS unit 7 may join the video conference actively (via Dial-In). Alternatively, the RSS unit 7 may be automatically requested by the an Application Server (AS) via the IMS core (e.g., the Conf AS) to join (Dial-Out). The recoding of the conference (and by that the request to the RSS unit 7 to join the video conference) can start at any point of the video conference (e.g., at a later point of time in the video conference when a user of the video conference client devices 1, 1' decides to record it).

The RSS unit 7 may store all received RTP media streams in an appropriate format in the storage system 10. In addition to audio data and video data, the RSS unit 7 may also store meta data and presentation data (e.g., image data from slides which were presented during the video conference). Each of these types of data may be provided from the MRF unit 12 to the RSS unit 7 using an own media stream or as part of a single media stream.

In addition to storing the video conference data, the RSS unit 7 may generate video conference data to be distributed to the video conference client devices 1, 1'. In order to do this, the RSS unit 7 may create file segments and a description of the stored video conference data including timestamps and meta-data (e.g., a Media Presentation Description (MPD) data structure in DASH). An MPD may be a (e.g., XML based) data structure that may be included in a HTTP message but may also be part of a SIP message.

The RSS unit 7 may provide the recorded video conference data to the video conference client devices 1, 1' via arbitrary existing streaming technologies (e.g., using HTTP streaming). The provision of the video conference data to the video conference client devices 1, 1' may be done in real time or, in case of segmented streaming, with a delay. If HTTP based streaming is used, the delay may depends on the length of the HTTP file segments used for streaming. Due to the delay, in order to allow smooth switching between recorded (first media stream) and live (second media stream) video conference data (i.e., switching from Watcher Mode to Live Mode when using fast forward), it is necessary to buffer live RTP media streams in the video conference client devices 1, 1'. An end-to-end delay of the Watcher Mode (i.e., for recorded data streams) occurring when the video conference data provided to the video conference client devices 1, 1' is buffered in respective storage units of the video conference client devices 1, 1' may for example be up to 30-60 seconds if HTTP streaming is used. The end-to-end delay is defined by the sum of transmission delays, encoding and decoding operations, client buffering time, processing in the RSS unit 7, and (in the case of HTTP base streaming) segmentation.

HTTP based streaming has the advantage that it reuses existing Internet infrastructures and that it is favored over RTSP streaming today. HTTP based streaming is mostly client based and does not require modification of existing HTTP servers. In the system shown in FIG. 6, HTTP media files and HTTP media description files may be stored on the RSS unit 7 from where the video conference client devices 1, 1' receive the HTTP files using HTTP GET (request/response) messages.

The RSS unit 7 may provide the recorded video conference data to the video conference client devices 1, 1' either in a mixed mode (i.e., in one media stream including e.g. mixed video conference data from multiple video conference client devices 1, 1' like video data from multiple video conference client devices 1, 1' mixed into one picture) or in separated media streams. In the latter case, it is left up for the video conference client devices 1, 1' to mix the separated media streams into one stream based on which the video signal is generated.

As already mentioned, the RSS unit 7 is responsible for the generation and storing of video conference meta data. One or more of events, notifications, material introduced during the video conference, etc., are reflected by the meta data. The meta data may be extracted from media streams received by the RSS unit 7 from the MRF unit 12 and other data sources, such as Conference signaling exchanged via SIP (Event Package for Conference State, RFC 4575); Conference Booking Information (HTTP); External databases (like phone directory, social networks) connected to the RSS unit 7; Media Control Messages exchanged in RTCP; and automatic media content analysis of RTP streams (audio and video, slides) received from the MRF unit 12. Conference Booking Information refers to predefined frameworks for conference event and status signaling (an HTTP input interface and a booking server that may be used in this regard are not shown in FIG. 6). Media control messages exchanged in RTCP may be signaled in parallel to the media (e.g., by the MRF unit 12).

The meta data may include (but is not limited to) the following types of information: Basic conference information (e.g., one or more of start time, end time, scheduled or ad-hoc, invited participants, etc.); join events (e.g., one or more of who, when, which media); leave events (who and/or when); current active speaker (who and/or noise level); slide media scene change notification (e.g. next slide displayed, movie has started, etc.); present person names, locations of the persons, and so on.

As mentioned above, the RSS unit 7 may collect meta data from different data sources. The RSS unit 7 may analyse and process the meta data with the goal to synchronize, filter and prepare useful historical information for the video conference client devices 1, 1' and store the same. The RSS unit 7 may synchronize the meta data received from different data sources. While synchronizing the meta data, all meta data may be put in a chronological order (e.g., for later presentation on a playback timeline and history). If a global timestamp is available, it may be used for arranging the meta data in a chronological order. If no global timestamp is available, the RSS unit 7 may store the meta data using reference timestamps, in order to be able to synchronize the meta data at a later point of time. The reference time stamps provide a joint reference for all parallel streams. The reference time stamps are used for synchronization purposes may, for example, be derived from a local server time.

The RSS unit 7 may carry out analysis of the media streams received from the MRF unit 12 (using, e.g., face recognition, location and content analysis, etc.) in order to generate meta data. The RSS unit 7 may create indices for generated meta data to make it searchable later on. The meta data may be provided with respective timestamps and/or references (e.g., links) to other related data or meta data.

Figure 7:
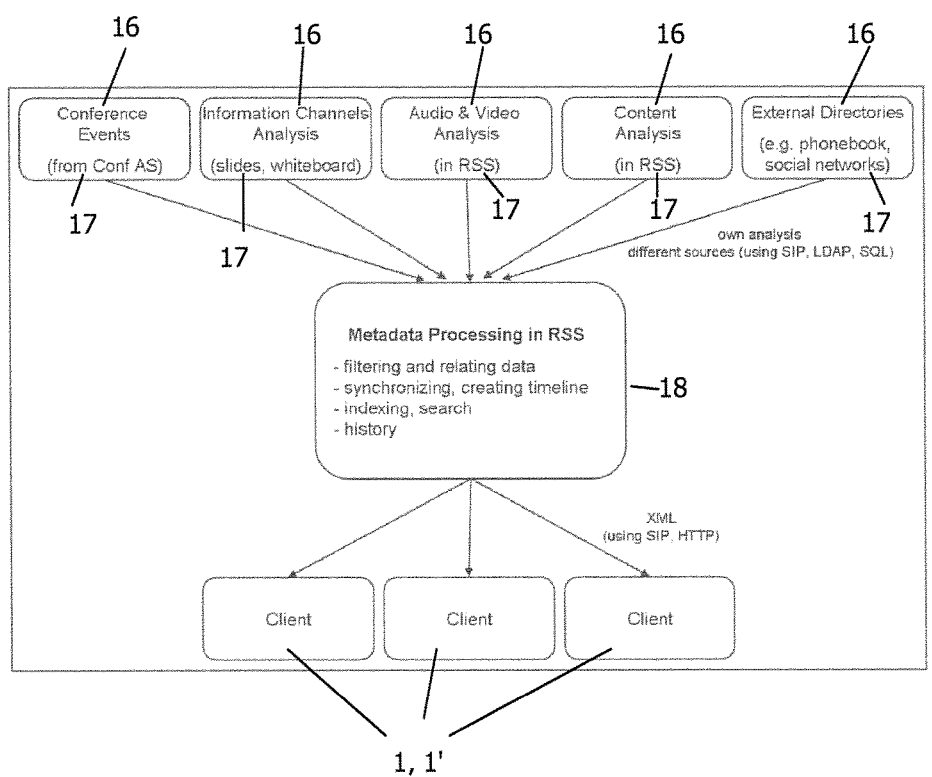
FIG. 7: is a schematic diagram illustrating the generation of meta data in a video conference system.

FIG. 7 schematically shows an embodiment of meta data processing in which meta data of different types 16 is collected by the RSS unit 7 from a plurality of data sources 17 connectable to the RSS unit 7 and processed in a processing step 18 in the RSS unit 7. The processed meta data is transmitted to the video conference client devices 1, 1' on demand.

When the video conference client devices 1, 1' request recorded video conference data of a particular video conference from the RSS unit 7 or when they switch over from Live Mode into Watcher Mode, the RSS unit 7 prepares all meta data related to the particular video conference for sending to the video conference client devices 1, 1'. Meta data sent to the client devices 1, 1' is independent of the pervading mode (i.e. Live of Watcher Mode). This means that the meta data can be sent even if no streams are received. One possibility is using SEP via the IMS core, and another way is direct interface from the client devices 1, 1' to the RSS unit 7 (e.g., using HTTP and XML).

To receive meta data from the RSS unit 7, the video conference client devices 1, 1' may subscribe to the RSS unit 7 by sending a SIP SUBSCIRBE message via the IMS unit 14. The RSS unit 7 may in response send a SIP NOTIFY message to the video conference client devices 1, 1'. The SIP NOTIFY message may for example carry an XML body with a defined structure for the meta data. The RSS unit 7 may regularly send meta data updates (SIP NOTIFY messages) comprising the latest generated meta data to the video conference client devices 1, 1' while recording an ongoing video conference and while generating/processing new meta data (on the fly).

If HTTP streaming is used, the meta data may be signaled to the video conference client devices 1, 1' as an additional XML structure and may be included as multipart/mixed content in the HTTP media stream transferred (as first media stream) from the RSS unit 7 to the video conference client devices 1, 1' (MPD). The MPD information may be included in a XML data structure, but may be treated as a separate message. If the content of the meta data would exceed allowable message sizes, it may be provided via HTTP such that links to the full data are included in the MPD or SIP signaling.

The meta data may be presented together with the recorded video conference data (e.g., on a timeline or in an overlay mode) which enables a user to selectively browse for recorded video conference data. The displayed meta data may for example include one or more of: disruptive conference events in a timeline; discussion heat and active speaker over time; snapshots of presentation media like slides or papers which may be presented as a storyboard parallel to a time line and may be opened by selecting the snapshots; and overlay information which is overlaid over (and associated with) particular participants like names, phone numbers, etc.

The meta data may comprise links to additional information sources for collecting further meta data like Internet links (e.g., a facebook link of a participant). Search functionality may implemented in the video conference client devices 1, 1' based on indexing of the meta data, e.g., find a list of conferences for a participant, find an active speaking period of a participant in a video conference and jump to this point of the video conference.

Figure 10:
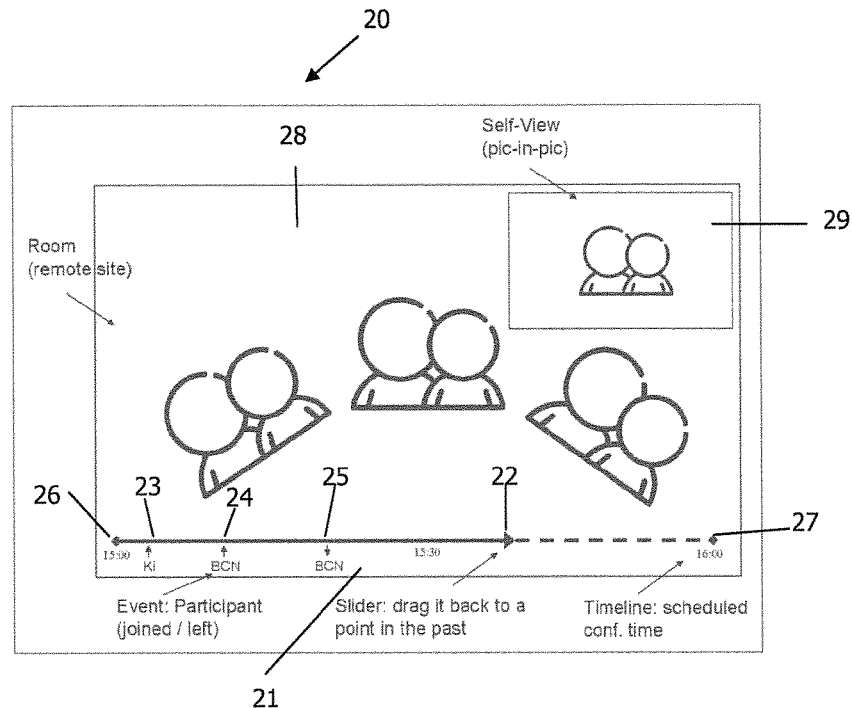
FIG. 10: is a schematic diagram illustrating an embodiment of a man-machine interface in a video conference system.

FIG. 10 shows an exemplary man machine interface 20 (graphical user interface like a screen or a touchscreen). The graphical user interface 20 comprises a timeline 21 and a time slider 22. The timeline 21 shows a total conference time (including a start time 26 and a scheduled end time 27) and the conference progress (current time). The current progress is indicated by a bold line, whereas the remaining conference time is indicated by a dotted line. The timeline 21 may be used to display relevant meta data (e.g., timepoints when other participants joined or left, slides that were shown on at that specific time of the conference, etc.).

Here, the meta data indicates that, at time point 23, participant Ki entered the video conference, that, at time point 24, participant BCN entered the video conference, and that, at time point 25, participant BCN left the video conference. Also other meta data may be displayed: For example, an icon may be displayed at a point of time where a user introduced a slide. By clicking on the icon, the user may then open the slide. The time slider may be used to jump to an arbitrary point of time of the video conference. The user may use the time slider 22 to switch interactively between a Live Mode and a Watcher Mode (i.e., between a live data stream (second data stream) and a recorded data stream (first data stream)).

In the Live Mode the user may see the active remote endpoint in full picture (large display area 28) and himself or herself in small picture (small display area 29). In the Live Mode, the video conference client 1, 1' where the graphical user interface 20 is implemented can send video conference data like audio data, video data, presentation data or meta data. The video conference client 1, 1' may be configured to, when switching to Watcher Mode, not send video conference data like audio data, video data, presentation data or meta data. However, it still may keep the SIP session alive and receive live media streams like audio data streams, video data streams, presentation data streams or meta data streams. At the same time, the video conference client 1, 1' may retrieve the recorded media files from the RSS unit 7 to playback video conference data from a chosen point in time (a point of time of the past). In the Watcher Mode, the user may see in the small display area 29 the live conference while watching the recorded part of the video conference in the large display area 28. Control buttons such as Play, Pause, Rewind and Forward may be displayed on the graphical user interface 20 and used to control the playback, e.g., to fast forward or pause play back. Video conference navigation signals may be generated by actuating the control buttons.

A conference participant may decide to join the videoconference in two ways: In Live Mode a user joins the present moment of the video conference. That is, in Live Mode the user is dialed into the live conference and receives media streams in realtime. In Watcher Mode, the user joins the video conference at any point of time of the past (e.g., starts watching from the start of the conference), so that the user receives recorded media streams from the RSS unit 7. That is, the user watches the past of the live conference which has not yet necessarily ended. In the Watcher Mode, the user does not actively take part in the live conference.

Figure 8:
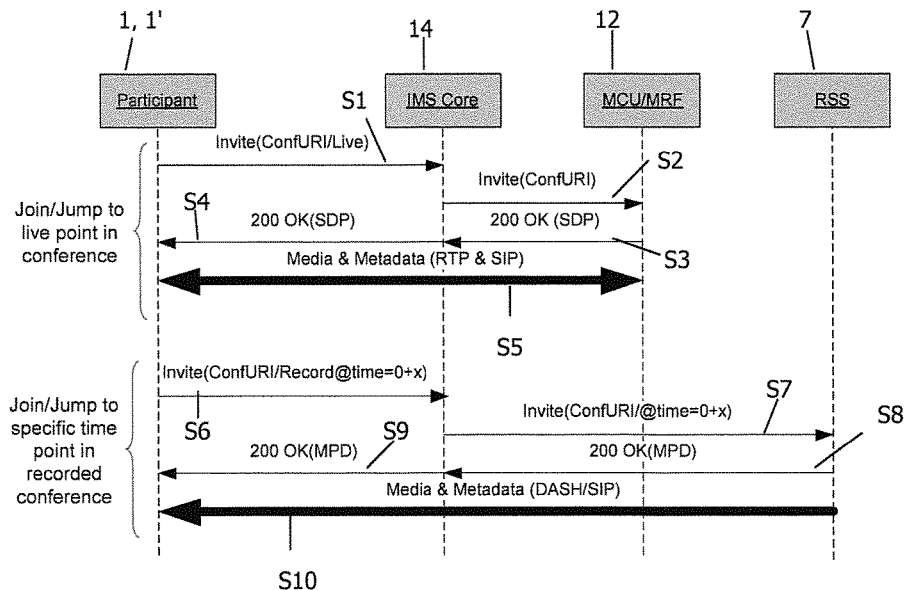
FIG. 8: is a schematic signaling diagram illustrating an embodiment of communication between the components of a video conference system.

In FIG. 8, a two embodiments of joining a video conference are shown. The first embodiment comprises steps S1 to S5: At step S1, video client conference device 1, 1' sends a request for joining a live video conference to IMS unit 14. At step S2, the IMS unit 14 forwards the request to MRF unit 12. At step S3, the MRF unit 12 sends a confirmation message to IMS unit 14 which forwards the confirmation message to the video client conference device 1, 1' at step S4. At step S5, a live media stream (second media stream) is received by the video client conference device 1, 1' from the MRF unit 12. The video client conference device 1, 1' also sends video conference data to the MRF unit 12 since it actively participates the video conference.

The second embodiment comprises steps S6 to S10: At step S6, the video client conference device 1, 1' sends a request for jumping to a particular point of time of the past of the video conference to the IMS unit 14. At step S7, the IMS unit 14 forwards the request to a RSS unit 7. At step S8, the RSS unit 7 sends a confirmation message to IMS unit 14, which forwards the confirmation message to the video client conference device 1, 1' at step S9. At step S10, a media stream (first media stream) is received by the video client conference device 1, 1' from the RSS unit 7 which represents recorded live media stream data (recorded data of the second media stream). The video client conference device 1, 1' does not send video conference data to the MRF unit 12 since it only passively participates the video conference.

Figure 9:
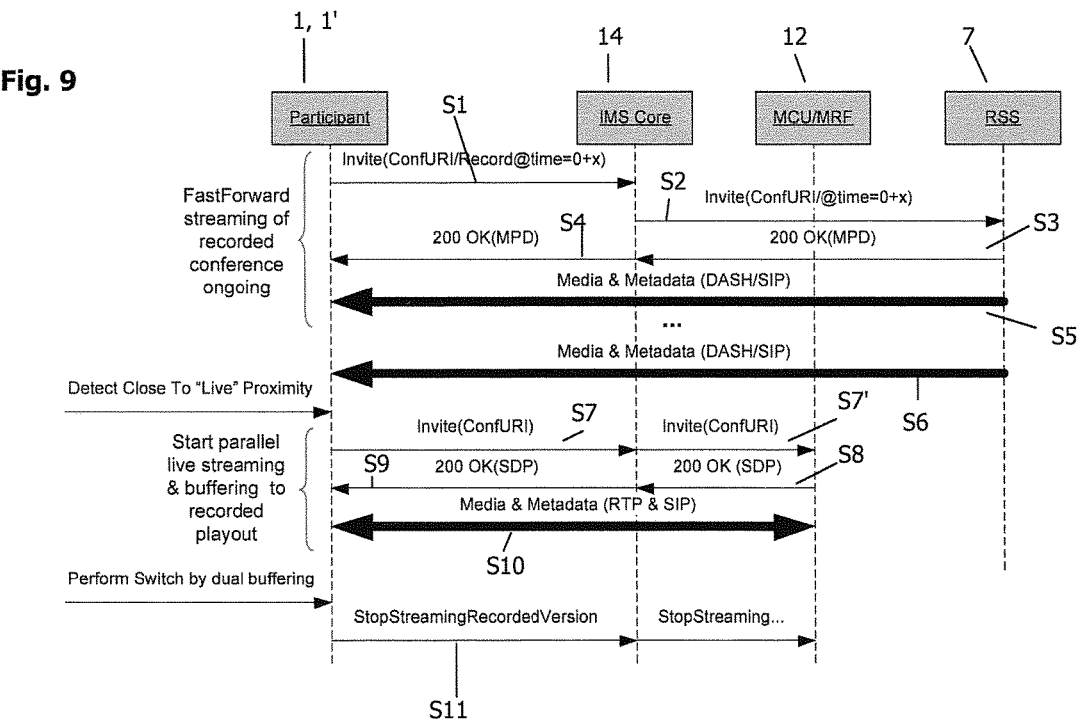
FIG. 9: is a schematic signaling diagram illustrating an embodiment of communication between the components of a video conference system.

In FIG. 9, an embodiment of a video conference browsing process is shown. In response to an actuation of a user of a video conference navigation tool (e.g., a forward browsing button), at step S1, video client conference device 1, 1' sends a request for jumping to a particular point of time of the past of a video conference to IMS unit 14. At step S2, the IMS unit 14 forwards the request to RSS unit 7. At step S3, the RSS unit 7 sends a confirmation message to the IMS unit 14 which forwards the confirmation message to the video client conference device 1, 1' at step S4.

At step S5, a media stream (first media stream) is received by the video client conference device 1, 1' from the RSS unit 7 which represents recorded live media stream data (recorded data of the second media stream). The video client conference device 1, 1' does not send video conference data to the MRF unit 12 since it only passively participates the video conference. At step S6, a media stream (first media stream) is still received by the video client conference device 1, 1' from the RSS unit 7.

Then, due to a forward browsing process of the video conference caused by the generation of video conference navigation signals, it is detected that the point of time of the video conference currently displayed is close to the present moment of the video conference. Thus, at step S7, the video client conference device 1, 1' sends a request for joining a live video conference to the IMS unit 14. At step S7' the request is forwarded to the MRF unit 12. At step S8, the MRF unit 12 sends a confirmation massage to IMS unit 14 which forwards the confirmation message to the video client conference device 1, 1' at step S9.

At step S10, a live media stream (second media stream) is received by the video client conference device 1, 1' from the MRF unit 12 in addition to the first media stream. At this point, it is switched from the first media stream to the second media stream (i.e., the video signal is now generated based on the second media stream instead based on the first media stream). The video client conference device 1, 1' also sends video conference data to the MRF unit 12 since it actively participates in the video conference. At step S11, the first media stream is terminated. In the case that the second media stream is already received during the transmission of the first media stream, steps S7 to S9 can be omitted, and only step S11 may be carried out after having switched from the first media stream to the second media stream.

As has become apparent from FIGS. 8 and 9, the meta data for the first media stream may be transported using existing standardized SIP messages directly at the beginning of transmitting the first media stream. In this way, the video conference client 1, 1' obtains all (up-to now) existing meta data related to the first media stream. Current meta data that has been newly recorded at the RSS unit 7 may be sent via SIP messages to the client (SIP SUBSCRIBE/NOTIFY), e.g., as soon as it is available or in batches.

Any "time jumps", initiated by a user, may be done using the processes as described in FIGS. 8 and 9. Data transmission of the first media stream and the second media stream may be done in parallel. An unused media stream may be disabled and enabled later again when it is needed again. This decision to activate or deactivate a media stream may be done based on user decisions, or on network conditions, like available bandwidth.

All trick play mode transitions, except from Fast-Forward to live may be realized in a smooth way with mechanisms of existing streaming standards (e.g., DASH).

As shown in FIG. 9, when the video conference client 1, 1' renders the first media stream in fast-forward mode, it can happen that the forward rendering "catches up" the present moment of the video conference and thus coincides with the ongoing live conference. In this situation, a specific synchronization, including buffering processes and signaling processes allows the video conference client 1, 1' a smooth transition between the fast-forward mode and the live media stream (second media stream).

If the video conference client 1, 1' is in fast-forward mode and the current buffered and rendering time point of the first media stream (media from RSS unit 7) is getting closer to the present moment, the video conference client 1, 1' may request the transmission of the second media stream in parallel to the first media stream (unless these two media streams are already transmitted in parallel).

The video conference client 1, 1' may extend its buffer significantly for the reception of the live stream (second media stream) in order to get more play-out flexibility, during the switch over from the first media stream to the second media stream. The media timestamps in the first media stream and in the second media stream preferably coincide, due to the timestamp synchronization provided by the RSS unit 7. As soon as the first timestamp from the buffered second media stream appears in the fast-forward rendered first media stream, the video conference client 1, 1' may switch to the buffered second media stream. The video conference client 1, 1' may stop the transmission of the first media stream after the switch. Since there might be a significant gap (in the order of up to 60 seconds, due to the end-to-end delay of the first media stream) between the current last received video packages of the second media stream and the current play out of the first media stream from the buffer, the video conference client 1, 1' may apply technologies known as adaptive play out, to render a smooth transition from fast-forward to live (local buffering of the received live stream).

Figure 11:
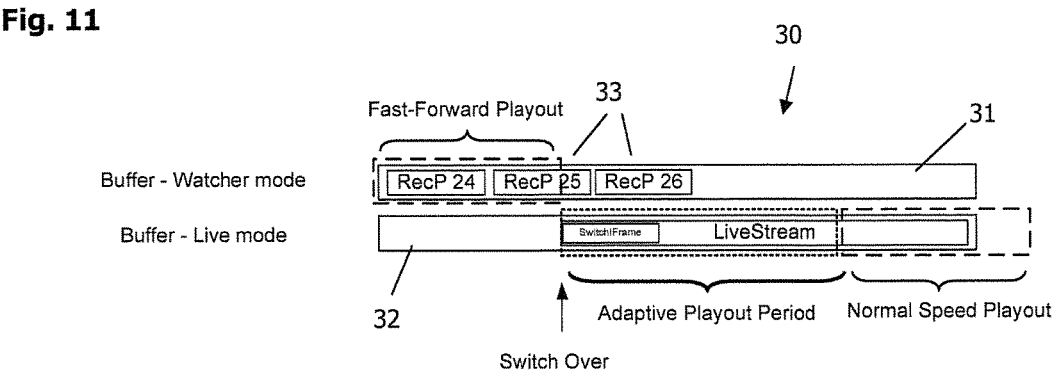
FIG. 11: is a schematic diagram illustrating an embodiment of a buffer structure usable when switching between a first data stream and a second data stream.

In FIG. 11, an embodiment of a buffer structure 30 is shown which may be used when switching from a Watcher Mode to a Live Mode (i.e., when switching from the first media stream to the second media stream). The buffer structure 30 comprises a first buffer 31 and a second buffer 32. The first buffer 31 is used for storing the first data stream, and the second buffer 32 is used for storing the second data stream. The first buffer 31 stores data packages 33 which are concatenated into the first media stream. As soon as the timestamps of the data packages 33 coincide with the data packages of the data packages of the live stream (second media stream), it may be switched over from the first buffer

31 to the second buffer 32 (i.e., the video signal may be generated based on the content of the second buffer rather than based on the content of the first buffer 31). Since the first media stream and the second media stream sufficiently overlap ("adaptive playout area"), a smooth transition from the first media stream to the second media stream can be ensured.

In the Watcher Mode, HTTP streaming may be used to transmit content (in the form of a first media stream) from the RSS unit 7 to the video conference client devices 1, 1'. The video conference client devices 1, 1' may request content (media description and media files) from the RSS unit 7 using a HTTP GET request. Control plane and user plane may both be based on HTTP. Media may be sent unidirectionally from the RSS unit 7 to the video conference client devices 1, 1'. The RSS unit 7 may receive meta data from different sources which are not explicitly shown in FIG. 6. Conference events may be carried to the RSS unit 7 using SIP protocols. The RSS unit 7 may analyze the RTP media streams and may as well query other data sources such as phone directories using appropriate data interfaces. In the Live Mode, a bidirectional media exchange may be established using RTP as transport protocol, whereas in the Watcher Mode, media may only be sent from the RSS unit 7 to the client devices 1, 1' using, in this example, HTTP. The start of the Watcher Mode could also be done via a normal HTTP GET request, instead of IMS based HTTP streaming using the SIP INVITE as pictured in FIGS. 8 and 9.

According to embodiments of the technique presented herein, the user has just one single entry into the conference. He or she may decide to directly join the conference or to catch-up an already started conference by means of recorded material and meta data with smooth joining of the live conference. This solution allows as well to replay an already closed conference, where the user can browse through the conference by means of processed meta data and fast replay technologies.

Embodiments of the present invention increase the meeting experience of the participants. The value and usability of conference recording is increased using meta data to mark conference events, and synchronizing events and additional information with the recording. Check-back questions can be avoided when a participant can easily recap already presented information he has missed. Selectively watching relevant parts of a conference is enabled by the help of meta data, audio and video analysis.

The presented invention allows a simple documentation and presentation of all video conference content, through the integration of meta data and indexing based on the meta data.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

The invention claimed is:

1. A video conference client device, comprising:
a communication unit configured to receive a first media stream representing a recorded video conference and further configured to receive meta data related to the first media stream, the meta data representing chronological events that occurred during the video conference, wherein the meta data representing the chronological events in the video conference comprises, for each of the chronological events, an event identifier for identifying the event and timestamp information for identifying a time at which the event occurred,
a processing unit connected to the communication unit and configured to carry out a concatenation process during which at least a part of the first media stream and at least a part of the meta data are concatenated into a video signal, and
a man machine interface unit connected to the processing unit, the man machine interface unit comprising:
a display unit configured to display the video conference on the basis of the video signal, wherein the meta data are presented on the display unit to a user together with data of the recorded video conference, and
an input unit configured to generate, based on an input, a video conference navigation signal,
wherein the processing unit is configured to control play out of the video signal in dependence on the video conference navigation signal, so as to enable a user of the video conference client device to perform event-related browsing of the chronological events that occurred during the video conference.

2. The video conference client device of claim 1, wherein the communication unit is further configured to receive a second media stream and wherein the processing unit is further configured to selectively generate the video signal from at least one of the first media stream and the second media stream based on the video conference navigation signal.

3. The video conference client device according to claim 2, wherein data of the first media stream received latest by the communication unit represents a first point of time of the video conference, and wherein data of the second media stream received latest by the communication unit represents a second point of time of the video conference, wherein the first point of time is older than the second point of time.

4. The video conference client device according to claim 3, wherein the second point of time represents the present moment or a point of time close to the present moment of the video conference.

5. The video conference client device according to claim 1, wherein the man machine interface unit comprises one or more video conference navigation tools including at least one of a time bar, a time slider, a play button, a forward browsing button, a backward browsing button, a skip button, a stop button, a pause button, or an event button, and wherein the man machine interface unit is configured to generate, upon actuation of one of the at least one video conference navigation tool based on an input of the input unit, the video conference navigation signal.

6. The video conference client device according to claim 1, wherein the man machine interface unit is configured to display a time bar on the display unit which represents the chronological events of the video conference, wherein the input unit is configured to select a point of time on the time bar, and to generate, in response to such a selection, the video conference navigation signal, wherein the processing unit is configured to generate, in response to the video conference navigation signal, the video signal such that the point of time of the video conference displayed on the display unit corresponds to the selected point of time on the time bar.

7. The video conference client device according to claim 1, wherein the man machine interface unit is configured to display a time slider element on the display unit, and to slide the time slider element along the time bar based on an input of the input unit in order to select a point of time of the time bar, and to generate the video conference navigation signal reflecting the selected point of time on the time bar.

8. The video conference client device according to claim 1, wherein the communication unit is configured to request the transmission or to stop the transmission of one or both of the first media stream and the second media stream.

9. The video conference client device according to claim 2, wherein the communication unit is configured to request, in case that the communication unit currently only receives the first media stream, and in case that the video conference navigation signal generated by the input unit implies that the video conference is browsed towards the present moment, the transmission of the second media stream from a media stream server or from a media stream data source different from the media stream server while still receiving the first media stream from the media stream server.

10. The video conference client device according to claim 2, wherein the communication unit is configured to request, in case that the communication unit currently receives the first media stream and the second media stream, and in case that the video conference navigation signal generated by the input unit implies that the video conference is browsed towards the present moment, a stop of transmission of the first media stream from a media stream server to the communication unit while still receiving the second media stream from the media stream server or from a media stream data source different from the media stream server, if a temporal distance between the present moment and a current browsing position falls below a threshold value.

11. The video conference client device according to claim 2, wherein the processing unit is configured to replace a play out of the first media stream with a play out of the second media stream in case that the video conference has been browsed to the present moment.

12. The video conference client device according to claim 2, wherein the display unit comprises a first display area configured to visualize the first media stream, and a second display area configured to visualize the second media stream.

13. The video conference client device according to claim 12, wherein the processing unit is configured to generate the video signal so as to visualize the first media stream and the second media simultaneously.

14. The video conference client device according to claim 1, wherein the meta data comprises video conference event information including at least one of a start or end of the video conference, joining times or departing times of one or more participants of the video conference, one or more slides that were presented during the video conference, the volume of the participants of the video conference, and names of the participants of the video conference.

15. The video conference client device according to claim 1, wherein the man machine interface is configured to display on the display unit, based on the meta data, the chronological events as icons or letters along a time bar in correspondence with their time of occurrence.

16. A non-transitory computer readable recording medium storing a computer program product comprising program code portions which embody/carry out any component or method step as described in claim 1 when the computer program product is carried out on one or more computing devices.

17. A method of operating a video conference, comprising:
   receiving, at a communication unit of a video conference client device, a first media stream representing a recorded video conference and meta data related to the first media stream, the meta data representing chronological events that occurred during the video conference, wherein the meta data representing the chronological events in the video conference comprises, for each of the chronological events, an event identifier for identifying the event and timestamp information for identifying a time at which the event occurred,
   carrying out, by a processing unit connected to the communication unit, a concatenation process during which at least a part of the first media stream and at least a part of the meta data are concatenated into a video signal,
   generating, by an input unit connected to the video conference client device, based on an input, a video conference navigation signal, and
   displaying, by a display unit connected to the video conference client device, the video conference on the basis of the video signal and the video conference navigation signal, wherein the meta data are displayed together with data of the recorded video conference, so as to enable a user of the video conference client device to perform event-related browsing of the chronological events that occurred during the video conference.

* * * * *